Feb. 18, 1941.    W. FASIG ET AL    2,232,658
WIPER
Filed Nov. 23, 1938    2 Sheets-Sheet 1
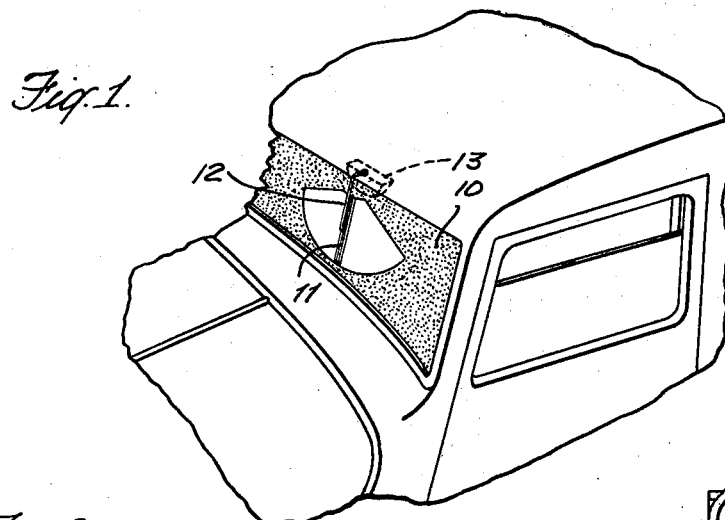
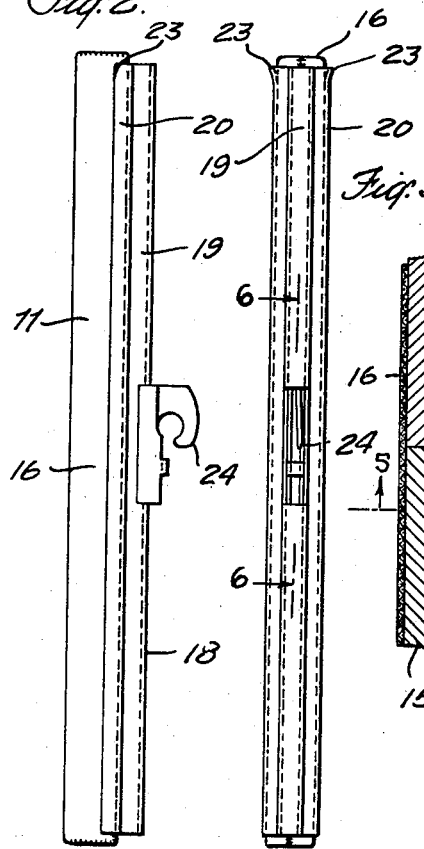
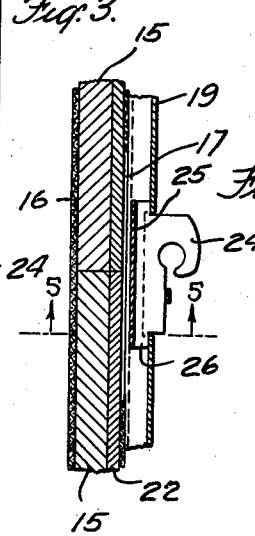
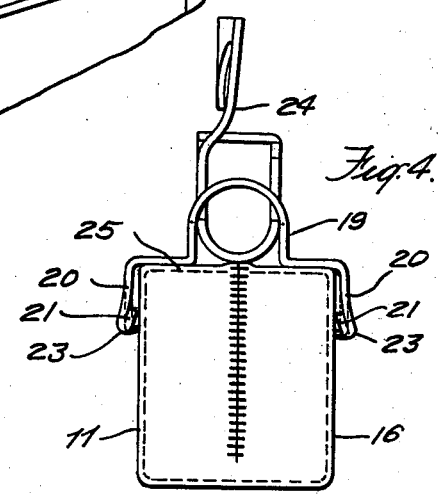
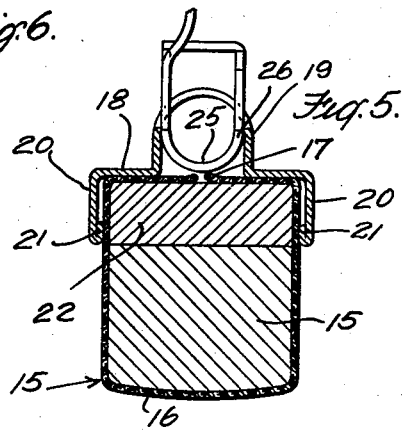
Inventor
Wayne Fasig, Raymond A. Rodrick
Paul A. Krider, Dimitri C. Abdelnour
By *Newell & Spencer & Safford*    Attorney

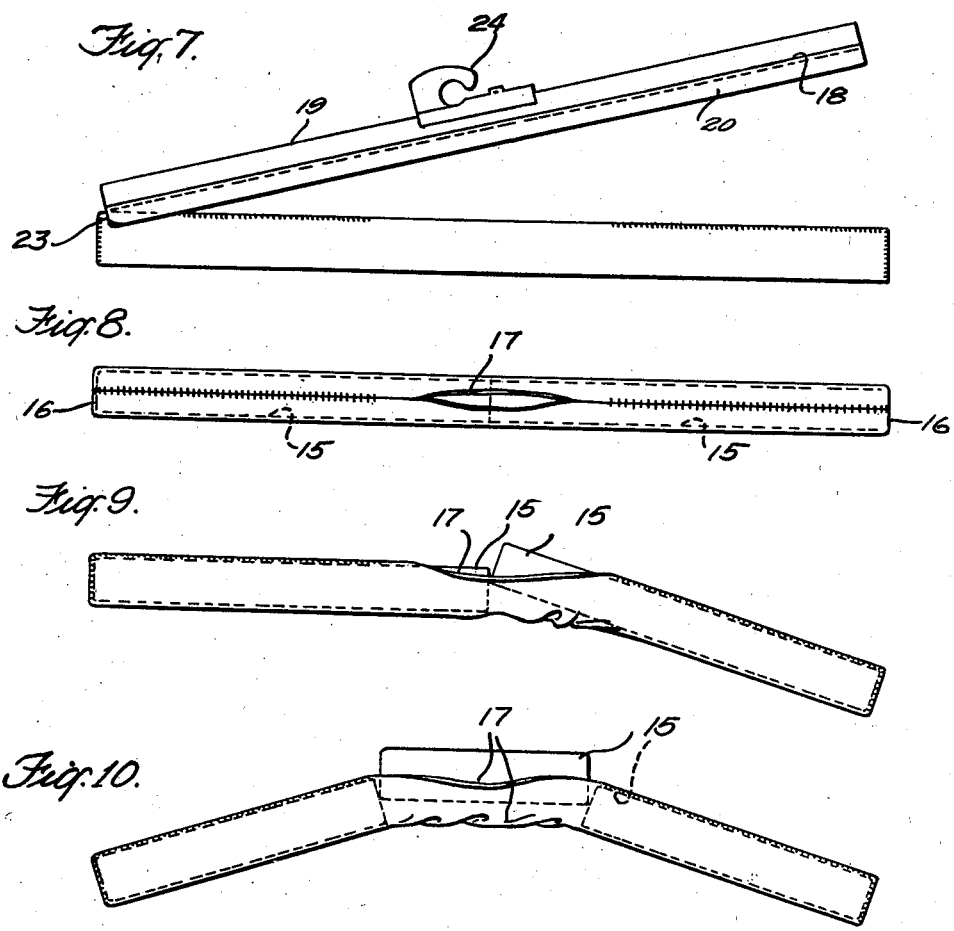

Patented Feb. 18, 1941

2,232,658

UNITED STATES PATENT OFFICE 2,232,658

WIPER

Wayne Fasig, Paul A. Krider, and Raymond A. Rodrick, Akron, Ohio, and Dimitri C. Abdelnour, Port Chester, N. Y., assignors to The Sleetex Company, Inc., New York, N. Y., a corporation of New York Application November 23, 1938, Serial No. 241,940

2 Claims. (Cl. 15—250.3)

This invention relates to devices for wiping sleet, frost and the like from surfaces upon which they have become deposited. More particularly the invention relates to wiper blades and fillers therefor of the type which carry a supply of the water soluble anti-freeze material within a pervious bag.

The devices such as those shown and described in the prior Patents Nos. 2,009,377 and 2,018,338 have proven highly successful and have been manufactured and used in large numbers particularly for the clearing of automobile windshields during sleet and snow storms.

One object of the present invention is to improve the devices of the type shown in these prior patents by reducing so far as possible the width without reducing substantially the quantity of anti-freeze material in the available supply.

Another object of the invention is to provide a device which will be more economical to use because capable of refilling with additional anti-freeze material when the original supply has become exhausted.

Another object of the invention is to provide an improved device which will be more economical to manufacture.

Other objects and advantages will appear from the following specification and the accompanying drawings.

In these drawings we have shown a preferred embodiment of our invention and certain modifications thereof. These have been chosen with a view to illustrating the invention and the best way of using the same, in order that others skilled in the art may fully understand the invention and the principles thereof so that they may be able to embody the invention in various forms and to modify it so as best to meet the requirements of any particular use.

Fig. 1 is a perspective view of an automobile with the device of our invention in use;

Fig. 2 is a view in side elevation of a wiper blade embodying our invention shown on a larger scale;

Fig. 3 is a top plan view;

Fig. 4 is a view in end elevation of the same;

Fig. 5 is a view in cross section of the same;

Fig. 6 is a fragmentary longitudinal section showing the connecting clip;

Fig. 7 is a view showing the back being mounted on the bag and filling;

Fig. 8 is a top plan view of the bag and filling without the back;

Fig. 9 is a phantom view in side elevation of the bag with the filling being inserted therein;

Fig. 10 is a view similar to Fig. 9 showing a slightly different embodiment of the invention in which three or more sticks are used in the filling instead of two.

Referring to the drawings, we have shown in Fig. 1 a portion of an automobile having windshield glass 10 exposed to sleeting, for example, by a rain or wet snow falling while the air temperature is a few degrees below freezing so that, upon striking the cold surface of the glass, the rain or snow becomes frozen onto the glass and cannot be satisfactorily removed by an ordinary rubber squeegee wiper blade.

According to the present invention, the blade 11, connected to the ordinary wiper arm 12 of a windshield wiper motor device 13, serves to remove this sleet or snow by wiping the glass with a blade saturated with a water soluble anti-freeze material in which the snow or ice dissolves to form a solution which does not freeze until a much lower temperature. In this way the area of the glass within the scope of the swinging blade is kept clear and free from ice and snow. This action is similar to that described in the prior Patents Nos. 2,009,377 and 2,018,338.

The blade embodying the present invention differs, however, from the blade shown in the prior patents primarily in the formation of the back and in the fact that the bag is not completely and permanently attached to the back but is removable therefrom so that when the supply of anti-freeze material has become exhausted the bag can be removed from the back and refilled with a new supply of anti-freeze material and this refilled bag or a new bag and filling both can be inserted into the bag. Our invention is concerned particularly with the structure of the back and the combination of this with other structures by which this result is made possible and practicable.

In the case illustrated in Figs. 2 to 9 inclusive, the filling may consist of a pair of compressed salt sticks 15 tightly fitted within the bag 16. This bag 16 is, as shown, continuous along the face and two sides and is seamed at the end and part way from each end along the back leaving an open slit central along the back. Through this slit 17 the sticks 18 may be inserted into each end, abutted end-to-end at the middle as shown in Fig. 9, and pressed into position and into a tight fit within the bag as will be obvious from Fig. 9. In this position the bag closes again over the back naturally and automatically; it may, but need not be sewed or sealed together at this slit.

The back 18, as clearly shown in the drawings, is designed to form a stiff pressure distributing member by which the force from the wiper arm 12 is distributed to the sticks of anti-freeze material, and it is provided with side members adapted to engage the sides of the filler assembly to hold the bag and filling assembled with the back and to distribute lateral force for moving the assembly across the surface to be wiped.

In the case shown, the back is made of a simple strip of corrosion resistant sheet metal bent to form a central longitudinal rib 19 and with side portions bent down at 20 to form a channel slightly narrower than the width of the filling so that when the filling and bag are inserted into this channel these side portions of the back will press resiliently against the filling and clamp the bag between them and the filling.

In the example shown, the extreme edges of the strip of which the back is formed are bent inwardly at 21 so as to form a narrow ridge on which the actual contact between the back 18 and the filling or bag 16 occurs. This has the advantage that it gives a more secure engagement with no tendency to expel the filler.

Since, as will be observed, the engagement of the back with the remainder of the blade depends primarily upon the pressure relation between the side portions 21 and the filling of the bag 16, it is important that there shall remain within the bag at least a strip 22 near the back of the filling which is adapted to withstand the compression exerted by the side members 20 on the back 18. It is important likewise that this compression strip should continue to serve this function until substantially all of the available supply of anti-freeze material has been consumed. It should, therefore, be sufficiently water-resistant so that it does not dissolve away nor disintegrate by being wet for relatively long periods of time. A convenient way of forming this strip 22 is to impregnate a part of the stick of anti-freeze material adjacent the back with a water-resisting binder, as for example, a lacquer or paraffin or a resinous binder. In this case the compression strip is integral with the stick of anti-freeze material. Or a water-resisting compressed fiber board, e. g., about $\frac{3}{32}$ to $\frac{1}{8}$ of an inch thick, may be placed in the bag over the stick of anti-freeze material. A very desirable material for this purpose is a compressed asphalt-impregnated board which is now in common use in automobile body construction. This strip is cut to substantially the same width as the stick or sticks of anti-freeze material and inserted into the bag at the back of the stick as shown at 22 in Figs. 5 and 6.

In order to facilitate the assembly of the back with the filler, consisting of the bag 16 and the stick 15 together with any compression strip 22 which may be used therewith, the back is designed, in the preferred embodiment shown, with the sides 20 slightly flaring at one end 23 so that at this end only the normal width of the channel between the sides 20 is slightly wider than the filler. Thus, when the back is to be assembled with the filler the end 23 is first slipped over the one end of the filler, as shown in Fig. 7. This is easily accomplished because of the greater width of the channel at this point. Then, holding down the end 23, the back 18 is swung downward into full engagement which occurs by a progressive springing apart of the sides 20 as the filler is progressively pushed between them. This leaves the back in a strongly spring pressed engagement with the filler.

In Fig. 6 is shown a portion of the back broken away to expose the connecter clip by which the device is connected to the wiper arm 12 for transmission of force therefrom in a direction toward the surface being wiped and laterally thereof for moving the blade across the surface. This clip is made of a simple stamping looped back upon itself, as shown at 25, and having portions 26 engaged in the looped edge extending laterally beyond the rest of the clip. The clip is inserted through a slot cut in the central rib 19 of the back 18, and its insertion is limited by the projecting part at 26. Advantageously but not necessarily, the clip is rigidly secured in this position, e. g., by spot welding.

It is an important advantage of our invention that the back is capable of reuse several times and, therefore, may be made of expensive corrosion resisting materials, such as stainless steel, Monel metal, etc., which will not deteriorate even under adverse conditions of storage and will remain bright and in good condition even after long use.

Although in the above a particular embodiment of the invention is described which is now considered best adapted for use in automobile windshield wipers, nevertheless, as already stated above, the invention may be embodied in numerous different forms. For example, the use of two sticks, as shown in Fig. 9 is not essential to the invention, and any other number may be used. If a single stick is used it is, of course, necessary that the slit along the top of the bag should extend to at least one end when the filling stick is inserted into the bag. This leaves the appearance of the bag not quite so near as where the slit is entirely covered by the back but obviously the slit may be sewed up or otherwise closed after the stick has been inserted. In Fig. 10 is shown a similar embodiment of the invention using three sticks instead of two and obviously any larger number could be used in a similar way.

Although the back 18 is shown as a simple strip bent to a shape which can be done by stamping short lengths of strips or by rolling the strip continuously, it is not essential that both the side members and the back rib should extend the full length of the blade and it is only necessary that the side members should be sufficient in strength, to hold bag 16 in position against the glass while it is connected to the back. Although the method of application shown in Fig. 7 has been found easiest and most desirable, it will be readily understood that the back may be engaged at the opposite end of the filler and slid longitudinally into place; and where this method of insertion is used it is not essential that the side members of the back should be resilient. They may engage in a groove or by compression of a resilient strip within the bag, used as the compression strip. Although it is important to make the compression strip water resisting, a certain amount of solution of the strip may be permitted provided that it retains its stiffness as against the compression by the side members and provided that the side members have sufficient resilience to move in to the extent required by such dissolving of the strip and without entirely losing their resilient pressure.

These suggestions are only a few examples of the numerous changes and modifications which can be made.

Certain features of the device described above and shown in the accompanying drawings which are the sole invention of one of us are more particularly claimed and described in a copending application Serial No. 204,540, filed April 27, 1938.

What we claim is:

1. A wiper for sleet, frost and the like, which comprises a bag of water pervious material, a filling in said bag of soluble anti-freeze material in compressed block form, a water resisting compression strip at the back of said filling, and a back comprising a resilient channelled metal strip slightly flared at least near one end thereof and having its sides spaced to receive and grip said compression strip with the bag clamped between, and means on the back for connecting it to a wiper arm of a mechanical wiper mechanism for transmitting force from said arm to said back in a direction toward the surface to be wiped and transversely thereto for moving the wiper across said surface.

2. A wiper for sleet, frost and the like which comprises a bag of water pervious material, a filling in said bag of a water soluble anti-freeze material at the face thereof and including a compression strip near the back thereof, a back comprising a resilient channelled metal strip with its sides turned up from the back to form a channel of width approximating that of said compression strip and with its side edges looped back under the sides of the channel with width less than the thickness of the compression strip whereby the inturned portions of the loop are clamped onto the compression strip by the resiliency of the channneled strip to form an engaging portion for engaging said compression strip and the bag between.

WAYNE FASIG.
PAUL A. KRIDER.
RAYMOND A. RODRICK.
DIMITRI C. ABDELNOUR.